April 24, 1951 J. B. SUTHERLAND 2,550,619
AIR DEFLECTOR
Filed Sept. 23, 1947
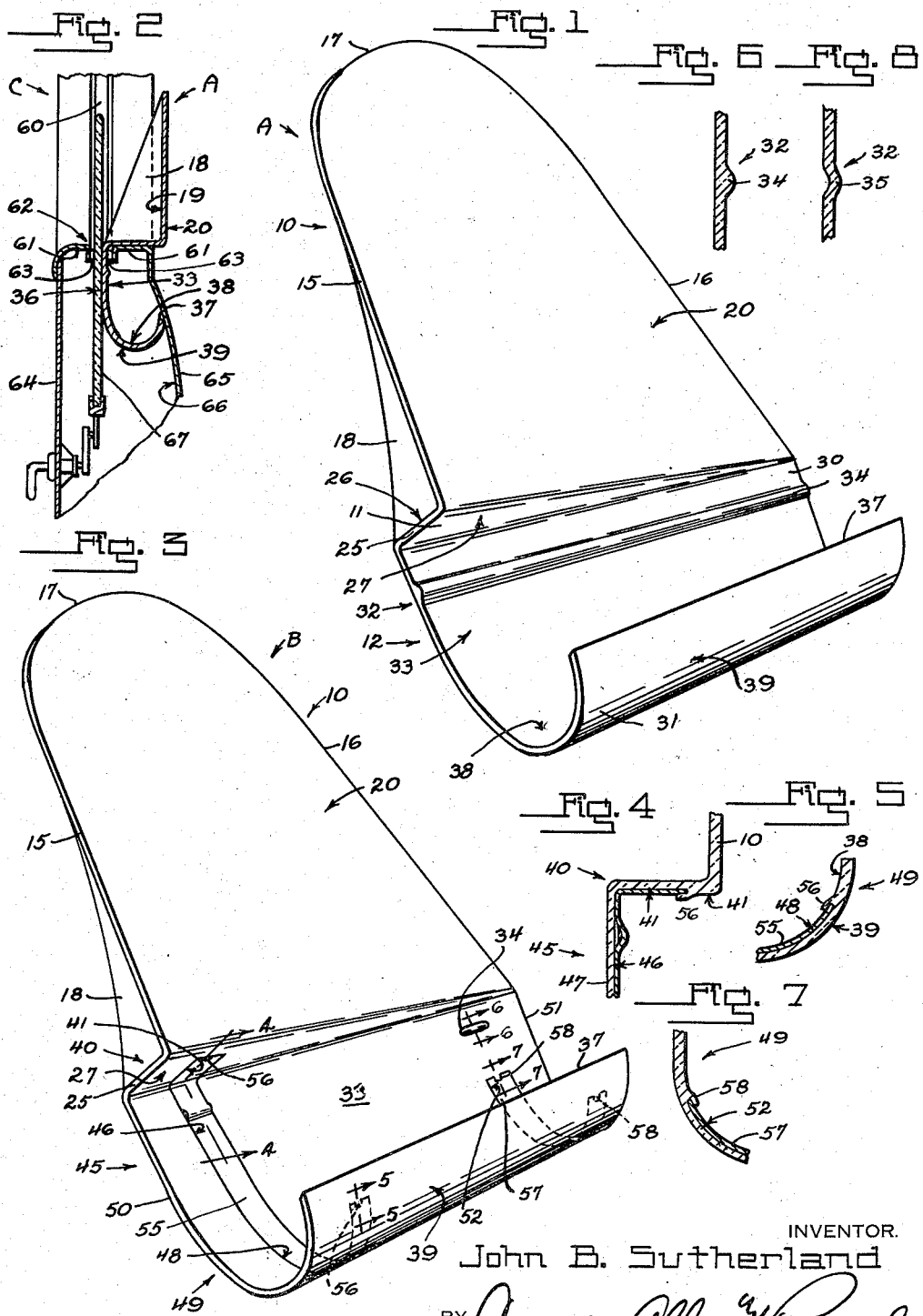
INVENTOR.
John B. Sutherland
BY Lancaster, Allwine & Rommel
ATTORNEYS.

Patented Apr. 24, 1951

2,550,619

UNITED STATES PATENT OFFICE 2,550,619

AIR DEFLECTOR

John Birger Sutherland, Detroit, Mich.

Application September 23, 1947, Serial No. 775,658

12 Claims. (Cl. 98—2)

This invention relates to air deflectors and more particularly to portable air deflectors. Such devices may be positioned temporarily in a window opening of, for example, a motor vehicle and removed, if desired, when no longer required.

An important object of the invention is to provide a novel air deflector which may be positioned, for instance, in the window opening of a motor vehicle so as to deflect air outwardly, or away from the window opening, and thus contribute toward air circulation within the vehicle without direct drafts striking the occupants. Or the deflector may be positioned so as to increase materially the air flow into the vehicle.

Another important object is to provide such an air deflector which may be positioned at any desired location longitudinally along the lower edge or sill of a window frame, so as to project upwardly and cover a selected portion of the window opening.

Still another important object is to provide a deflector of this kind which, when in position in a window opening of a motor vehicle (which opening may be closed normally by raising a lowered pane of glass to fill the opening), does not interfere with the raising (and lowering) of the pane so that, if desired, the deflector need not be removed when raising and lowering the pane.

A major object of the invention is to provide a deflector of this kind which requires no modification of any nature in the conventional window frame structure of a motor vehicle, when installed thereon.

A further object is to provide a portable air deflector which includes concealed attaching means, so that there are no projecting hooks, clamps nor the like to catch upon clothing or cause injury to the person.

In addition, an object is to provide a deflector which may be manufactured and marketed at low cost, is pleasing in appearance, may be constructed wholly or partly of modern hardened plastic materials, and takes up but very little room when not in use.

Other objects and advantages of the invention will be apparent during the course of the following detailed description of the invention, taken in connection with the accompanying drawing, forming a part of this disclosure, and in which drawing:

Figure 1 is a perspective view of one form of the invention.

Figure 2 is a vertical section of the deflector of Figure 1, positioned in the window opening of a motor vehicle.

Figure 3 is a perspective view of a modified form of the invention.

Figures 4 to 7 inclusive are sections substantially upon their respective lines of Figure 3.

Figure 8 is a section of a modification of the showing in Figure 6.

In the drawing, wherein for the purpose of illustration is shown preferred and modified forms of the invention and wherein similar reference characters designate corresponding parts throughout the several views, the letter A designates the preferred form of the invention, the letter B, a modified form, and C, a window structure.

The deflector A, shown particularly in Figure 1, and the deflector B, shown particularly in Figure 3, may be of metal (plain, plated, enameled or the like), hardened plastic materials (transparent, translucent, opaque, or combinations thereof and, if desired, colored) or combinations of metals and plastics. In the form A, there is a deflector portion 10, support portion 11, and retaining portion 12.

Referring mainly to Figures 1 and 2, the deflector body portion 10 comprises an upwardly-extending sheet of suitable material which may be shaped to have side edges 15 and 16, an arcuate upper edge 17, joining the edges 15 and 16, and a bottom section which joins the support portion 11. There are, of course, two faces 19 and 20 provided by the sheet, and it may be braced by the brace means 18, comprising a member extending upwardly from the support portion 11 at adjacent one edge, as the edge 15.

The support portion 11 is a sheet of material and this may be flat and three-sided, with a short edge 25, a long edge which merges into the body portion 10 and is, preferably, normal to the edge 25, and a third edge which defines the hypotenuse of the angle formed by the two edges previously mentioned. The third edge merges into the retaining portion 12, as will be described hereafter. The lower edge or end of the brace 18 joins the upper face 26 of the support portion 11, preferably adjacent the edge 20. The portion 11 has, of course, a lower face 27.

Depending from the support portion 11 is the retaining portion 12, and it may comprise a sheet of material having a downwardly-extending section 30, and an arcuate section 31 at the lower end of the section 30. The section 30 is, preferably, as wide as the section 31 and both as wide as the portion 11, and the section 30 joins the portion 11 at the hypotenuse mentioned. It is provided with one means to resist upward movement of the portions 10 and 11 when the deflector A is in use, as in Figure 2, and this means is shown as a projection 32 extending outwardly of the face 33 of the section 30. The projection 32 may be a solid rib or elongated boss 34, as in Figure 6, or a hollow rib or boss, as in Figure 8, the latter being formed by upsetting or embossing the material forming the section 30. There is, of course, a face 36 opposite the face 33.

The section 31 is of resilient material, may be as wide as the section 30, and extends, from the lower end of the section 30, in a curve, upwardly toward the plane of the face 27. Preferably, the arc is such that a part (as the free edge portion 37) of the section 31 normally extends outwardly of the vertical plane of the portion 10. The section 31 has a face 38 joining the face 33 and a face 39 merging into the face 36.

Referring now mainly to Figure 3, where the modified form B is shown, it will be seen that it is much like the form A, and similar reference characters designate like parts of both forms. However, the support portion 40 of form B is provided, in its lower face 27, with a recess 41, shown in Figure 4, and the retaining portion 45 of the form B has a recess 46 in its face 33 of its upper section 47 merging into the recess 41, and a recess 48 in its lower arcuate section 49 which merges into the recess 46 and falls short of the edge portion 37 of the form B. This combined recess may be disposed adjacent the merging edges of the portions 40 and 45 (as adjacent the edges 25, and 50).

In addition, the section 47 carries one means to resist upward movement of the portions 10 and 40, and is shown as a projetcion 34 extending outwardly from the face 33 of the section 47, and adjacent the edge 51. Below the projection 35 in the upper section 47 is shown a recess 52 in the face 33 of the lower section 49, which recess substantially parallels the combined recesses 46 and 48.

Disposed within the combined recesses 41, 46 and 48, is a means tending to restore the arcuate section 49 to substantially its original curvature after being distorted. This means may be a resilient metal insert 55, and it may be held in place by upsetting the material of the portions 40 and 45 to provide tongues 56 at the ends of the recesses 41 and 48, which tongues overlie the insert. Of course, this insert normally has a fixed curvature and tends to impart such curvature to the section 49.

The insert 55 preferably is provided with means to resist upward movement of the portions 10 and 40 of the form B, and this may be a projection 35 formed by upsetting the metal insert. Of course, the longitudinal axes of the projections 34 and 35, of the form B, coincide.

It is preferred that the recess 52 accommodate additional means tending to restore the section 49 to substantially its original curvature after being distorted. This means may be a resilient metal insert 57, held in place by tongues 58. Not only do the two metal inserts function as described, particularly when the portion 45 is of hardened plastic material, but they also aid in strengthening the portion 45.

Referring now to Figure 2, the window structure C is shown as a conventional one, such as employed in motor vehicles. Such a structure includes the walls of a window opening 60, having a sill 61, provided with a longitudinally-extending slot or passageway 62, having downturned edge portions, faced as at 63 with a compressible material, as felt, rubber or the like. The sill is supported by the spaced-apart, downturned walls 64 and 65 of the window structure, whereby a compartment 66 is provided into which the slot or passageway 62 opens and which compartment is constructed and arranged to accommodate the lowered closure 67 for the opening 60. This closure is, generally, a pane of glass, and there is provided suitable means to lower and raise the pane through the slot 62, with the compressible facing contacting the pane.

Either of the novel deflectors A or B may be positioned in the opening 60, with the pane either partly lowered or wholly lowered. This positioning of the deflector is accomplished by inserting the edge portion 37 into the slot 62 and feeding the sections 31 and 30, or the sections 49 and 46, as the case may be, through the slot until the portion 10 or 40, as the case may be, may be disposed upon the sill 61. By this time, the resilient means mentioned will have sprung into position against the inner face of one or the other of the walls 64 or 65 (in the example shown in Figure 2, it is the wall 65) and will bear thereagainst. The projections described will be then immediately below the facing 63, having compressed the latter in passing downwardly, and will resist even strong currents of air, aided by the frictional grip afforded by the arcuate sections of the retaining portions and the contact of the support portions with the sill.

The brace 18 retains the portion 10 against bending or vibrating, even when the air currents are strong, since the construction of the new deflectors is such that there is no necessity, nor is it desirable, to bend the portion 10 in any way while positioning either deflector in place.

The position of the deflector may be reversed readily, from that shown in Figure 2, so that the device will tend to deflect air into the vehicle through the window opening. When so positioned, the portions 31 or 49, as the case may be, will bear against the wall 64.

While the means provided will resist accidental displacement of the novel deflectors when positioned as described, a steady upward pull upon the body portion will cause the projections to pass upwardly over the compressed facing 63, as well as cause the sections of the deflector bearing against the walls 64 or 65, to slide upwardly along the particular wall. Further manipulations to remove the deflectors are obvious.

If there be any wear caused by the retaining means, this will be upon the inner, concealed surfaces of the walls 64 or 65, and not upon their outer surfaces, and there are no clumsy nor dangerous hook-like projections extending outwardly to retain the deflectors in place connected with the novel deflectors herein disclosed.

What is claimed is:

1. In a deflector for use in a window opening of a window frame structure having a compartment and a passageway from said opening to said compartment, said deflector including deflector means for disposal within said window opening, comprising a body portion; support means for contacting said frame structure at said opening, comprising a support portion carried by said body portion; and a retaining portion carried by one of said other portions and provided with a section extending through said passageway and resilient means extending from said section into said compartment for contact with a wall thereof to retain said deflector means against accidental displacement when said deflector means is within said window opening, including a curved section of resilient sheet material resiliently bearing against said wall.

2. In a deflector for a window opening of a window frame having a slotted sill and a walled compartment below said sill, said deflector including deflector means for disposal within said opening, comprising an upwardly-extending deflector body portion; a sill-engaging support portion; and means extending from said support portion, insertable through said slot and into said compartment to retain said deflector means, when within said opening, against accidental displacement, including a sheet of flexible material having an arcuate section, and an arcuate insert of resilient material carried by said arcuate section.

3. In a deflector for a window opening of a window frame having a slotted sill and a walled compartment below said sill, said deflector including deflector means for disposal within said opening, comprising an upwardly-extending deflector body portion; a sill-engaging support portion; and means extending from said support portion, insertable through said slot and into said compartment to retain said deflector means, when within said opening, against accidental displacement, including a length of resilient material having a curved section, an insert of resilient material carried by said length, and a bead extending from said insert and constructed and arranged to extend immediately below said sill and into said compartment when said means is within said opening.

4. In a deflector for a window opening of a window frame having a slotted sill and a walled compartment below said sill, said deflector including deflector means for disposal within said opening, comprising an upwardly-extending deflector body portion; a sill-engaging support portion; and means carried by said support portion, insertable through said slot and into said compartment to retain said deflector means, when within said opening, against accidental displacement, including a sheet of flexible material having an arcuate section with a substantially flat, elongated free edge, and means to strengthen said sheet of flexible material and cause it to assume an arcuate shape, comprising an arcuate insert of resilient material, with its longitudinal axis substantially normal to said edge, carried by said sheet at the concave face thereof, said insert being provided with a bead extending from said insert and constructed and arranged to extend immediately below said sill when said deflector means is within said opening.

5. In a deflector for a window opening of a window frame having a slotted sill and a walled compartment below said sill, said deflector including deflector means for disposal within said opening, comprising an upwardly-extending deflector body portion; a sill-engaging support portion; and means extending from said support portion, insertable through said slot and into said compartment to retain said deflector means, when within said opening, against accidental displacement, including a sheet of resilient material having an arcuate section with a substantially flat elongated free edge, and an elongated rib extending outwardly from said sheet and constructed and arranged to extend immediately below said sill when said deflector means is within said opening.

6. In a deflector for a window opening of a window frame having a slotted sill and a walled compartment below said sill, said deflector including deflector means for disposal within said opening, comprising an upwardly-extending deflector body portion; a sill-engaging support portion; a brace extending from said support portion to said body portion; and means extending from said support portion, insertable through said slot and into said compartment to retain said deflector means, when within said opening, against accidental displacement, including a sheet of flexible material having an arcuate section with a substantially flat elongated free edge, a recess extending toward said edge, an insert of resilient material in said recess, having a projection constructed and arranged to extend immediately below said sill when said deflector means is within said opening, and a projection carried by said sheet with its longitudinal axis substantially coincident with the longitudinal axis of said first projection and also constructed and arranged to extend immediately below said sill when said deflector means is within said opening.

7. As an article of manufacture an air deflector having a vertical upwardly-extending air deflecting portion, a support portion extending horizontally from said vertical portion, and a depending portion extending from said support portion and including a resilient section curved in an open arc in the direction of said horizontal portion and provided with a free edge.

8. As an article of manufacture, an air deflector for the window opening of an automobile door, said air deflector comprising an integral sheet of material formed into a substantially rigid air-deflecting, window opening-positioned portion having a substantially straight end, a supporting portion extending from said end and disposed substantially normal to said first named portion and having a substantially straight end, and a portion extending from said second-named end, including a section disposed substantially normal to said supporting portion, and a resilient section extending from said first-named section and curved into an open arc in the direction of said first-named end, said last-named section having a free edge.

9. In an air deflector for use in a window opening defined by walls of a window frame structure having other walls defining a compartment and walls defining a passageway leading from said opening to said compartment, said air deflector including a sheet material body having a substantially rigid air-deflecting portion for said opening, a supporting portion extending from and substantially normal to said air-deflecting portion for positioning upon a portion of said frame at said opening and passageway, and a portion depending from said supporting portion and including a section for extension through said passageway, and a resilient section extending from said first section, being curved into an open arc in the direction of said supporting portion for extension into said compartment and bearing against the inner face of a wall of said compartment.

10. An air deflector having a vertical upwardly-extending air deflecting portion, a support portion extending horizontally from said vertical portion and a depending portion extending from said support portion and including a resilient section curved in an open arc in the direction of said horizontal portion and provided with a free edge, and a curved insert of resilient material carried by said curved section.

11. An air deflector having a vertical upwardly-extending air deflecting portion, a support portion extending horizontally from said vertical portion, and a depending portion extending from said support portion and including a resilient section curved in an open arc in the direction of said horizontal portion and provided with a free edge, a curved insert of resilient material carried by said downwardly-extending portion at said resilient section, and a bead extending from said insert and constructed and arranged to extend below said support portion.

12. An air deflector having a vertical upwardly-extending air deflecting portion, a support portion extending horizontally from said vertical portion, and a depending portion extending from said support portion and including a resilient section curved in an open arc in the direction of said horizontal portion and provided with a free edge, said depending portion having a recess extending toward said edge, an insert of resilient material within said recess, said insert having a bead constructed and arranged to extend immediately below said support portion and said depending portion having a bead with the longitudinal axis of said last-named bead substantially coincident with the longitudinal axis of the first bead.

JOHN BIRGER SUTHERLAND.

REFERENCES CITED

The following references are of record in the file of this patent:

UNITED STATES PATENTS

| Number | Name | Date |
|---|---|---|
| 1,919,749 | Robinson | July 25, 1933 |
| 2,033,455 | Thorp | Mar. 10, 1936 |
| 2,066,589 | Thorp | Jan. 5, 1937 |
| 2,084,385 | Conley et al. | June 22, 1937 |
| 2,106,418 | Wagner | Jan. 25, 1938 |
| 2,281,840 | Hamilton | May 5, 1942 |